United States Patent
Mukai et al.

[11] Patent Number: 5,309,553
[45] Date of Patent: May 3, 1994

[54] APPARATUS FOR AND METHOD OF GENERATING A STRAIGHT LINE OF PIXELS IN A DISCRETE COORDINATE SYSTEM

[75] Inventors: Nobuhiko Mukai; Masatoshi Kameyama; Hiroyasu Negishi; Tsuyoshi Iizuka, all of Kanagawa, Japan

[73] Assignee: Mitsubishi Denki Kabushiki Kaisha, Tokyo, Japan

[21] Appl. No.: 714,203

[22] Filed: Jun. 12, 1991

[30] Foreign Application Priority Data

Jun. 15, 1990 [JP] Japan .................................. 2-157366
Jan. 17, 1991 [JP] Japan .................................. 3-003885

[51] Int. Cl.$^5$ .............................................. G06F 3/14
[52] U.S. Cl. .................................... 395/143; 395/141
[58] Field of Search ............... 395/143, 141; 340/747, 340/750, 723, 726, 740, 728; 364/512, 515, 754

[56] References Cited

U.S. PATENT DOCUMENTS

| | | | |
|---|---|---|---|
| 4,115,863 | 9/1978 | Brown | 395/143 |
| 4,283,765 | 8/1981 | Rieger | 395/143 |
| 4,648,049 | 3/1987 | Dines et al. | 364/521 |
| 4,667,306 | 5/1987 | Smith | 364/900 |
| 4,677,573 | 6/1987 | Brown et al. | 364/521 |
| 4,807,157 | 2/1989 | Fukushima | 395/143 |

OTHER PUBLICATIONS

IBM Technical Disclosure Bulletin vol. 27, No. 8, Jan. 1985, pp. 4618-4622.

*Primary Examiner*—Phu K. Nguyen
*Attorney, Agent, or Firm*—Wolf, Greenfield & Sacks

[57] ABSTRACT

A straight line generator for line drawing in a discrete coordinate system utilizing the Bresenham algorithm. A first counter holds an X coordinate value and is capable of incrementing and decrementing the X coordinate value and a second counter holds a Y coordinate value and is capable of incrementing and decrementing the Y coordinate value. A region code which depends on the slope of the line within the range of 360 degrees is stored. An error term obtained from the Bresenham algirithm is also stored. Responsive to the region code and the error term, increments of the first and second counters are controlled. Positive and negative added parameters which vary the error are stored in registers. Either of the date in the register is selected in accordance with the sign of the error term so as to be added to the error term.

15 Claims, 8 Drawing Sheets

| b₂ b₁ b₀ | θ |
|---|---|
| 000 | 0 ≤ θ < 45 |
| 100 | 45 ≤ θ < 90 |
| 101 | 90 ≤ θ < 135 |
| 001 | 135 ≤ θ < 180 |
| 011 | 180 ≤ θ < 225 |
| 111 | 225 ≤ θ < 270 |
| 110 | 270 ≤ θ < 315 |
| 010 | 315 ≤ θ < 360 |

Fig. 8

| SLOPE OF A LINE(t) | | 0=<t<45 | 45=<t<90 | 90=<t<135 | 135=<t<180 |
|---|---|---|---|---|---|
| A | | 000 | 100 | 101 | 001 |
| P | | -2\|X\|+2\|Y\| | 2\|X\|-2\|Y\| | 2\|X\|-2\|Y\| | -2\|X\|+2\|Y\| |
| N | | 2\|Y\| | 2\|X\| | 2\|X\| | 2\|Y\| |
| INITIAL VALUE OF S | | -\|X\|+2\|Y\| | 2\|X\|-\|Y\| | 2\|X\|-\|Y\| | -\|X\|+2\|Y\| |
| SIGN OF S AND OPERATION | POSITIVE | X=X+1<br>Y=Y+1<br>S=S+P | X=X+1<br>Y=Y+1<br>S=S+P | X=X-1<br>Y=Y+1<br>S=S+P | X=X-1<br>Y=Y+1<br>S=S+P |
| | NEGATIVE | X=X+1<br>Y=Y<br>S=S+N | X=X<br>Y=Y+1<br>S=S+N | X=X<br>Y=Y+1<br>S=S+N | X=X-1<br>Y=Y<br>S=S+N |

| SLOPE OF LINE(t) | | 180=<t<225 | 225=<t<270 | 270=<t<315 | 315=<t<360 |
|---|---|---|---|---|---|
| A | | 011 | 111 | 110 | 010 |
| P | | -2\|X\|+2\|Y\| | 2\|X\|-2\|Y\| | 2\|X\|-2\|Y\| | -2\|X\|+2\|Y\| |
| N | | 2\|Y\| | 2\|X\| | 2\|X\| | 2\|Y\| |
| INITIAL VALUE OF S | | -\|X\|+2\|Y\| | 2\|X\|-\|Y\| | 2\|X\|-\|Y\| | -\|X\|+2\|Y\| |
| SIGN OF S AND OPERATION | POSITIVE | X=X-1<br>Y=Y-1<br>S=S+P | X=X-1<br>Y=Y-1<br>S=S+P | X=X+1<br>Y=Y-1<br>S=S+P | X=X+1<br>Y=Y-1<br>S=S+P |
| | NEGATIVE | X=X-1<br>Y=Y<br>S=S+N | X=X<br>Y=Y-1<br>S=S+N | X=X<br>Y=Y-1<br>S=S+N | X=X+1<br>Y=Y<br>S=S+N |

|X|=|XE-XS| |Y|=|YE-YS| (XS,YS):COORDINATES OF START POINT (XE,YE):COORDINATES OF END POINT  Y:DATA IN Y-COUNTER  X:DATA IN X-COUNTER

APPARATUS FOR AND METHOD OF GENERATING A STRAIGHT LINE OF PIXELS IN A DISCRETE COORDINATE SYSTEM

BACKGROUND OF INVENTION

1. Field of the Invention

The present invention relates to an apparatus for and a method of generating a straight line in a discrete coordinate system, and more specifically to generation of a straight line of pixels by utilizing, for example, the Bresenham algorithm.

2. Prior Art

As a method of generating a straight line of pixels, such a method as DDA (Digital Differential Analysis) system has been known. Japanese Patent Public Disclosure No. 94378/85 discloses an example wherein the DDA system has been realized. FIG. 1 is a block diagram illustrating the construction of a straight line generator which employs the conventional DDA system. The reference numeral 51 designates an X-counter which increases or decreases an X coordinate; 52 a Y-counter which increases or decreases a Y coordinate; 53 a slope register adapted to hold the gradient of a slope; 54 an adder adapted to accumulate the content of the slope register; 55 a register adapted to hold the content of the adder 54; and 56, 57 selectors adapted to select carry signal from the adder 54 and a clock signal. The slope register 53, the adder 54 and the register 55 constitute a decimal-fraction calculating circuit adapted to compute a decimal fraction.

The operation of the DDA system will now be explained by referring to FIG. 1. Using the coordinate (XS, YS) of the start point and the coordinate (XE, YE) of the end point of a straight line the absolute value $|X| = |XE - XS|$ of a difference value X of the X coordinate components and the absolute value $|Y| = |YE - YS|$ of a difference value Y of the Y coordinate components between those two points are calculated by a circuit provided outside the straight line generator. (It is to be understood that the coordinate axis which corresponds to a large one of the absolute values $|X|$ and $|Y|$ will be referred to as the main axis.) It is assumed here that the X axis is the main axis. The slope of the line can be obtained by calculating the ratio between such two absolute values. In this case, it is also assumed that a larger absolute value of the respective coordinate components is used as a denominator and a smaller absolute value of the respective coordinate components is used as a numerator so as to calculate the ratio. Since the denominator is larger than the numerator, the ratio obtained is a decimal fraction less than unity. In this way, the ratio is equal to $|Y|/|X|$. First, after the register 55 has been reset, the ratio is loaded in the slope register 53, the X coordinate of the start point in the X-counter 51 and the Y coordinate of the start point in the Y-counter 52, respectively. The selectors 56, 57 operate to supply the clock signal to the counter for the main coordinate axis and the carry signal generated by the adder 54 at the time of adding the ratio output from the slope register 53 for every clock, to the counter for the rest of the coordinate axes. This causes the counter corresponding to the main coordinate axis to be operated for each clock and the counter for the rest of the coordinate axes to be operated by the carry signal output from the adder 54, whereby the X-counter 51 and the Y-counter 52 calculate interpolated coordinate values from the start point to the end point of the line and output such values. By repeating this operation, pixels making a straight line may be generated.

Besides the method explained above, many other methods of line drawing have been employed. Among them, a method of which the algorithm is simple and which is suitable for implementation in hardware is the Bresenham method which is very widely utilized today. A hardware version of a line drawing process using the Bresenham algorithm is found in Japanese Patent Public Disclosure No. 165280/87 filed by IBM Corp. with the title of "Set-up Apparatus for Graphic Vector Generator".

In the Bresenham algorithm, although it is not described in detail here, either one of the coordinate values is varied by $\pm 1$. The other of the coordinates may be varied or not depending on the value of an error term. The error term means a recorded distance between a correct path on a line measured to the direction perpendicular to the maximum variation axis (the main axis) and a point actually generated. In the case of $|X| \geq |Y|$, since the X axis is the maximum variation axis (or the main axis), the error term e is accordingly measured in the Y axis direction. It is to be noted here that the error term e is utilized to make a decision of being positive or negative and may be added by an integer for use.

Since a straight line generator according to the prior art is constituted as shown in FIG. 1, division has to be performed to compute the slope of the line and generation of parameters for such division takes time, resulting in a reduction in processing performance. In addition, the rate of time generation is also reduced due to the fact that data used for calculation are decimal fractions and therefore long.

Furthermore, since the "Set-up Apparatus for Graphic Vector Generator" disclosed in the above Japanese Patent Public Disclosure Official Gazette is an apparatus in which the symmetry of graphics is taken into consideration, parameters relating to X coordinate values have, in some conditions, to be exchanged with parameters relating to Y coordinate values. This necessitates a "swapping circuit", resulting in a large hardware scale and a long parameter setting-up time.

SUMMARY OF THE INVENTION

The present invention has been proposed to eliminate such problems as above described and has as its object to provide an apparatus for and a method of generating a straight line of pixels at a high speed in the range of 360 degrees without exchanging parameters.

A straight line generator according to an aspect of the present invention intends to improve the Bresenham algorithm and comprises a first counter which holds an X coordinate value and is capable of incrementing and decrementing the X coordinate value, a second counter which holds a Y coordinate value and is capable of incrementing and decrementing the Y coordinate value, a region code register for holding the region code depending on the slope of a line within the range of 360 degrees, an error register for holding an error term in the Bresenham algorithm, control logic for controlling an up/down counting operation of the first and second counters, N- and P-registers for holding data which cause the error register to be varied, and an adder for selecting either of the data in the N-register and the P-register by referring to the sign indicated by the error register so as to add the selected data to the error register.

Another aspect of the present invention assumes an apparatus for generating linear pixels comprising:

(a) means for reading X coordinate values and Y coordinate values of the start point and the end point of a line;

(b) means for computing an X difference absolute value and a Y difference absolute value between the start point and the end point of line;

(c) means for computing a region code defining one of the regions obtained by dividing the range of 360 degrees in accordance with the X difference value, the Y difference value and the ratio of these difference absolute values;

(d) means for computing an initial error term value based on the ratio of the X difference absolute value and the Y difference absolute value;

(e) means for computing a positive added value which is added to the error term when the error term value is positive;

(f) means for computing a negative added value which is added to the error term when the error term value is negative;

(g) means for executing the increment and decrement operations of the X and Y coordinates specified by a combination of the region code and the error term; and (h) means for adding either of the positive added value and the negative added value to the error term on the bases of a value of the error term, the pixel generating means and the error term adding means being repeatedly operated.

A further aspect of the present invention assumes a method of generating a straight line of pixels, comprising the steps of:

(a) reading X coordinate values and Y coordinate values of the start point and the end point of a line;

(b) computing an X difference absolute value and a Y difference absolute value between the start point and the end point of the linear line;

(c) computing a region code defining one of the regions obtained by dividing a circle in accordance with the X difference value, the Y difference value and the ratio of these difference absolute values;

(d) computing an initial error term value based on the ratio of the X difference absolute value and the Y difference absolute value;

(e) computing a positive added value which is added to the error term when the error term value is positive;

(f) computing a negative added value which is added to the error term when the error term value is negative;

(g) executing increment and decrement operations of the X and Y coordinates specified by a combination of the region code and the error term;

(h) adding either of the positive added value and the negative added value to the error term on the basis of a sign of the error term; and (i) repeating the pixel generating step and the error term adding step.

The straight line generator according to the present invention control up/down counting operations of the first counter and the second counter under the controls of the control logic based on the region code provided by the region code register and the sign of the error register (or the sign of the error term) so as to generate a straight line pixels by outputting X and Y addresses.

At the same time, the data of either of the N-register or the P-register are added to the data (the error term) of the error register depending on the sign of the error term. Since such processing as described above are executed using integers, high-speed straight line generation may be achieved.

Furthermore, since the region codes can cover the range of 360 degrees, pixels may be directly generated without exchanging the starting point and the ending point as well as an X coordinate and a Y coordinate.

Further, in the apparatus for generating a straight line pixels according to the present invention, the region code computing means is capable of computing any one of the region codes for any slope of a line within 360 degrees.

Also, since the pixel generating means performs operations of incrementing and decrementing 16 kinds of X and Y coordinates provided by combinations of the region codes and the sign of the error terms, pixels may be generated for a line with any slope without exchanging the parameters.

Other objects and advantages of the present invention will become apparent from the following detailed description taken in conjunction with the accompanying drawings.

BRIEF EXPLANATION OF THE DRAWINGS

FIG. 8 illustrates relationships among the slope of a line, X coordinates, Y coordinates, region codes, error data, P-register values and N-register values.

DESCRIPTION OF PREFERRED EMBODIMENTS

Figure 1:
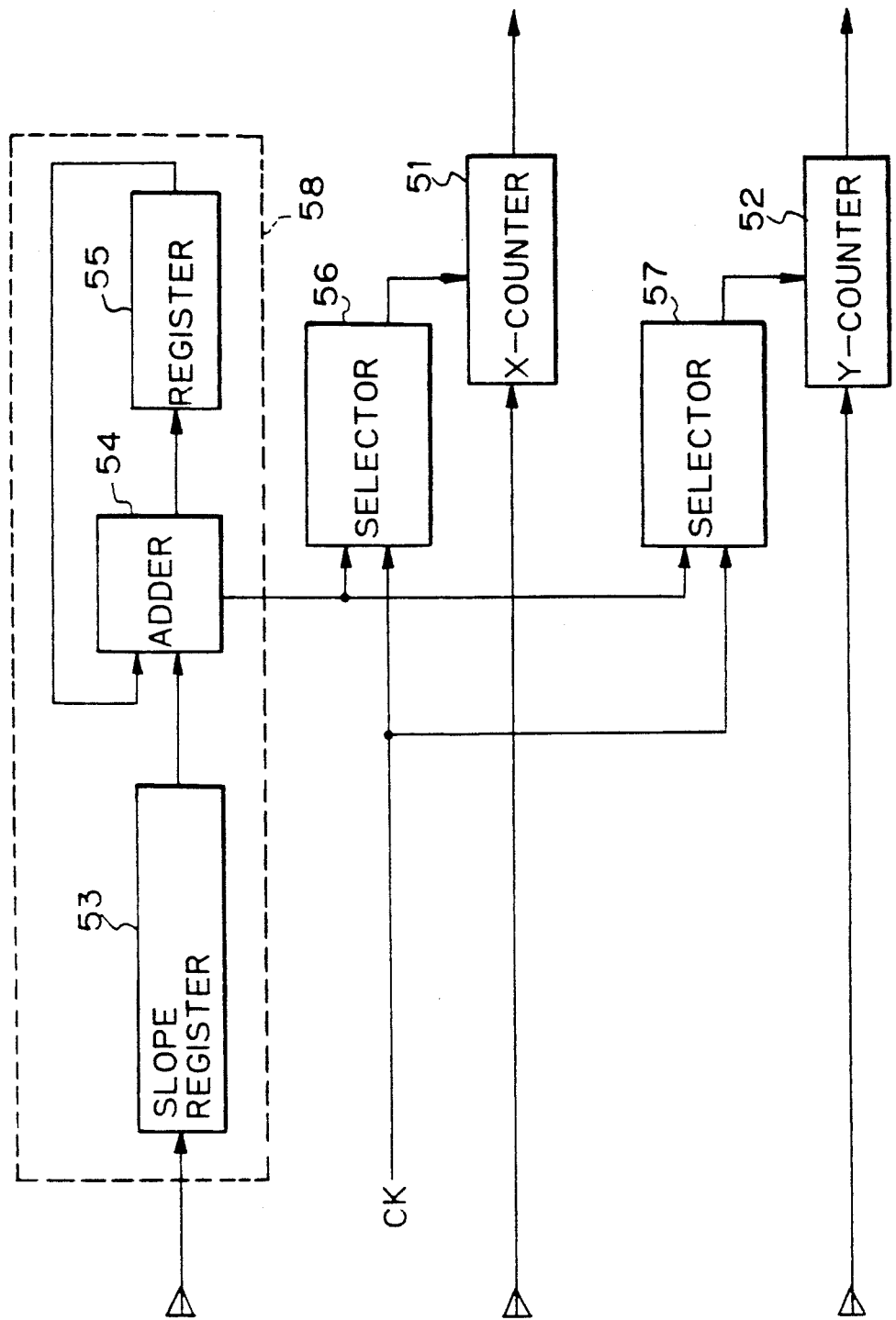
FIG. 1 is a block diagram illustrating the constitution of a straight line generator according to the prior art.
Figure 2:
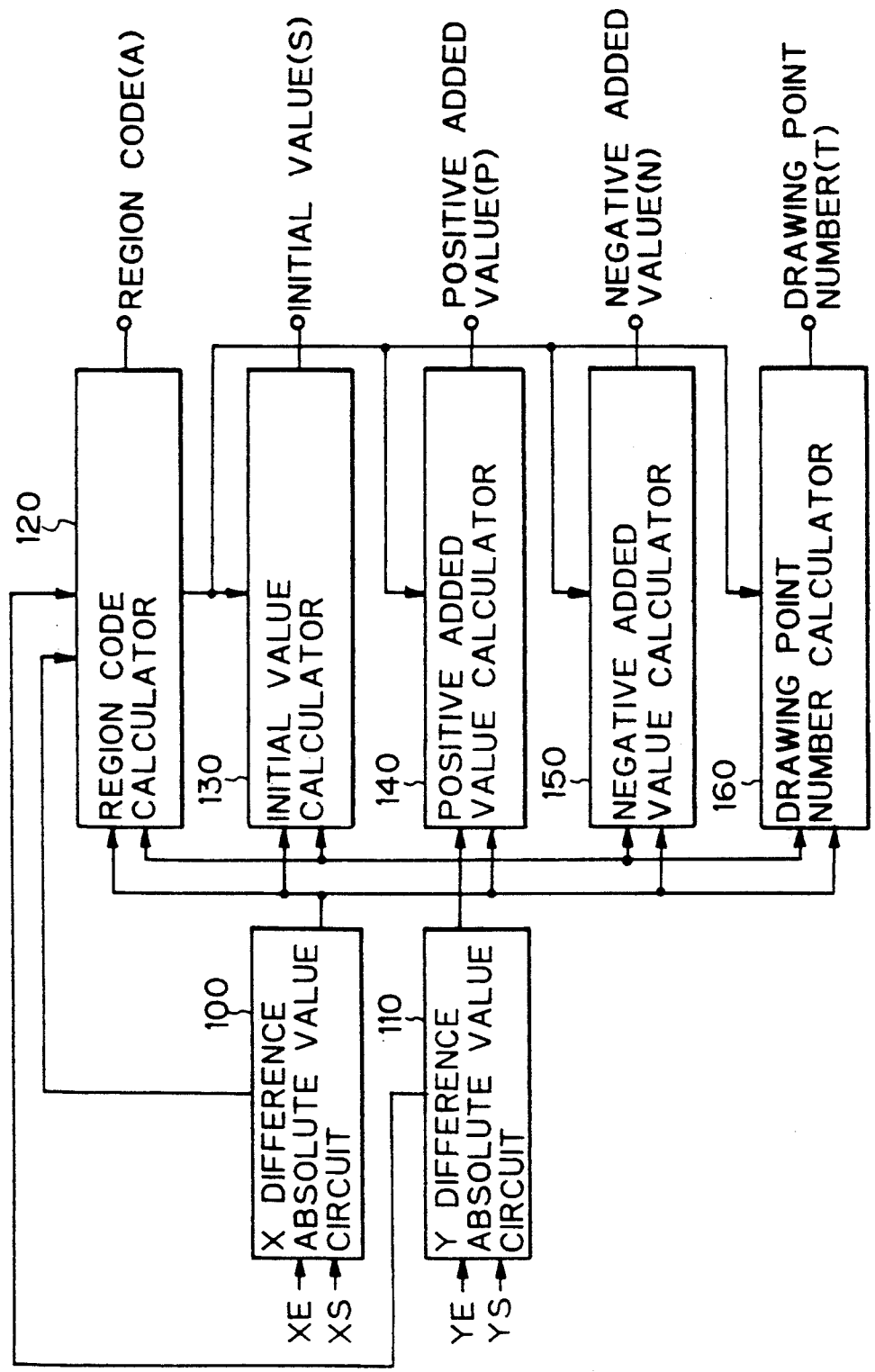
FIG. 2 is a conceptual diagram of a circuit for setting up line drawing parameters used for an embodiment of the present invention.

FIG. 2 is a schematic diagram of a circuit for setting up line drawing parameters which are used in an embodiment of the present invention (described later in detail).

In FIG. 2, the reference numeral 100 designates an X difference absolute value circuit for obtaining a difference between the X coordinate values of the opposite end points of a line and the absolute value of the difference; 110 a Y difference absolute value circuit for obtaining a difference between the Y coordinate values of the opposite end points of the line and the absolute value of the difference, 120 a region code calculating circuit adapted to obtain a region code A of a line in accordance with signals output from the X difference absolute value circuit 100 and the Y difference absolute value circuit 110; 130 an initial value calculating circuit for obtaining an initial value of an error (or referred to as an error term) in the Bresenham algorithm in accordance with a signal output from the region code calculating circuit 120; 140 a positive added value calculating circuit for obtaining a value P to be added to the error in the Bresenham algorithm based on a signal output from the region code calculating circuit 120 when the error is positive; 150 a negative added value calculating circuit for obtaining a value N to be added to the error in the Bresenham algorithm based on a signal output from the region code calculating circuit 120 when the error is negative; and 160 a line drawing point number calculating circuit for obtaining a signal T indicating the length of a line in the Bresenham algorithm based on a signal output from the region code calculating circuit 120.

Figure 3:
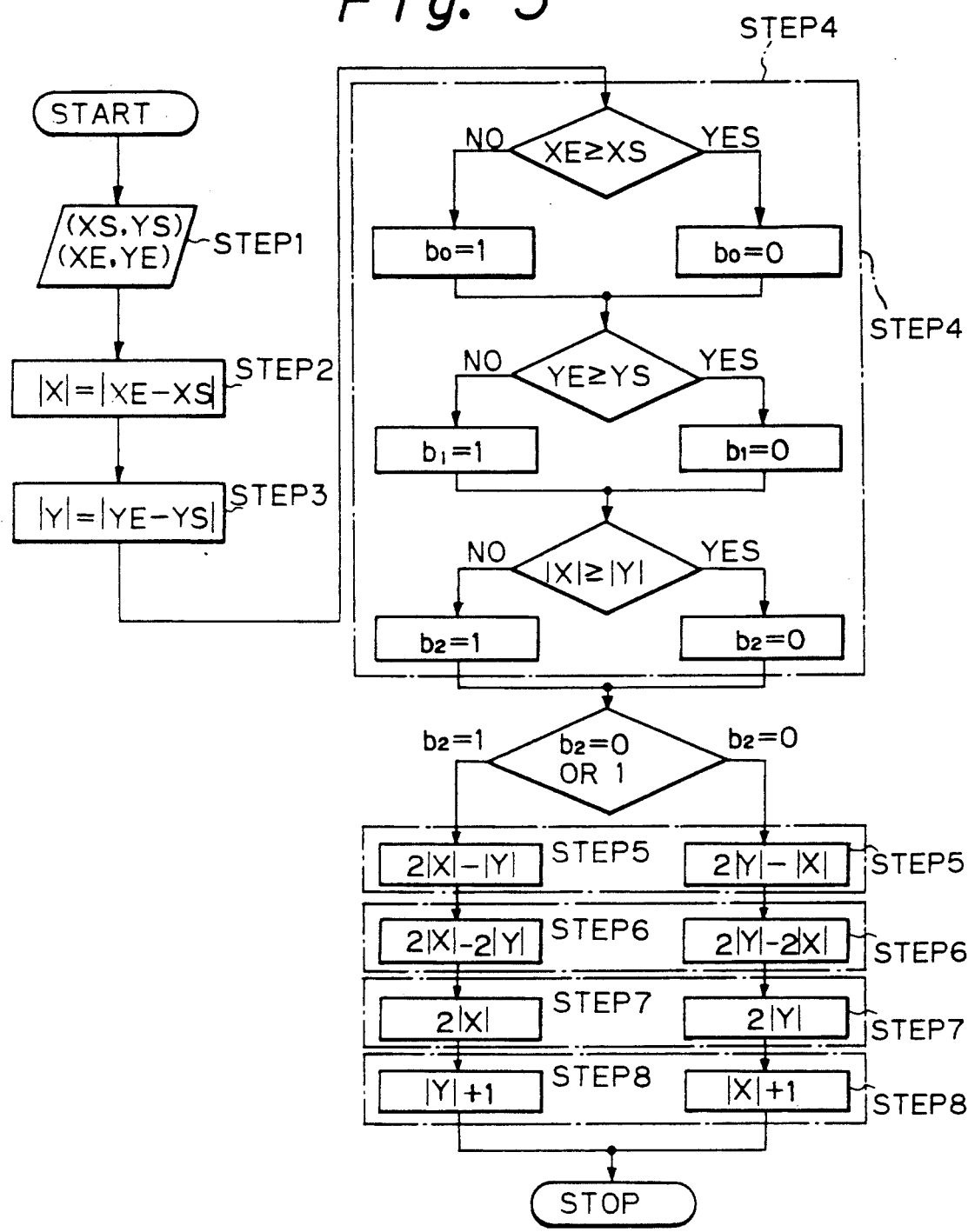
FIG. 3 is a flow chart illustrating parameter calculation steps.

FIG. 3 is a flow chart for explaining a process of computing parameters corresponding to FIG. 2.

In FIG. 3, the reference symbol STEP 1 designates an inputting step for reading X and Y coordinate values; STEP 2 a step for computing the absolute value of an X difference value; STEP 3 a step for computing the absolute value of a Y difference value; STEP 4 a step for computing a region code; STEP 5 a step for computing an initial value; STEP 6 a step for computing a positive added value; STEP 7 a step for computing a negative added value; and STEP 8 a step for computing the number of points to draw a line.

Figure 4:
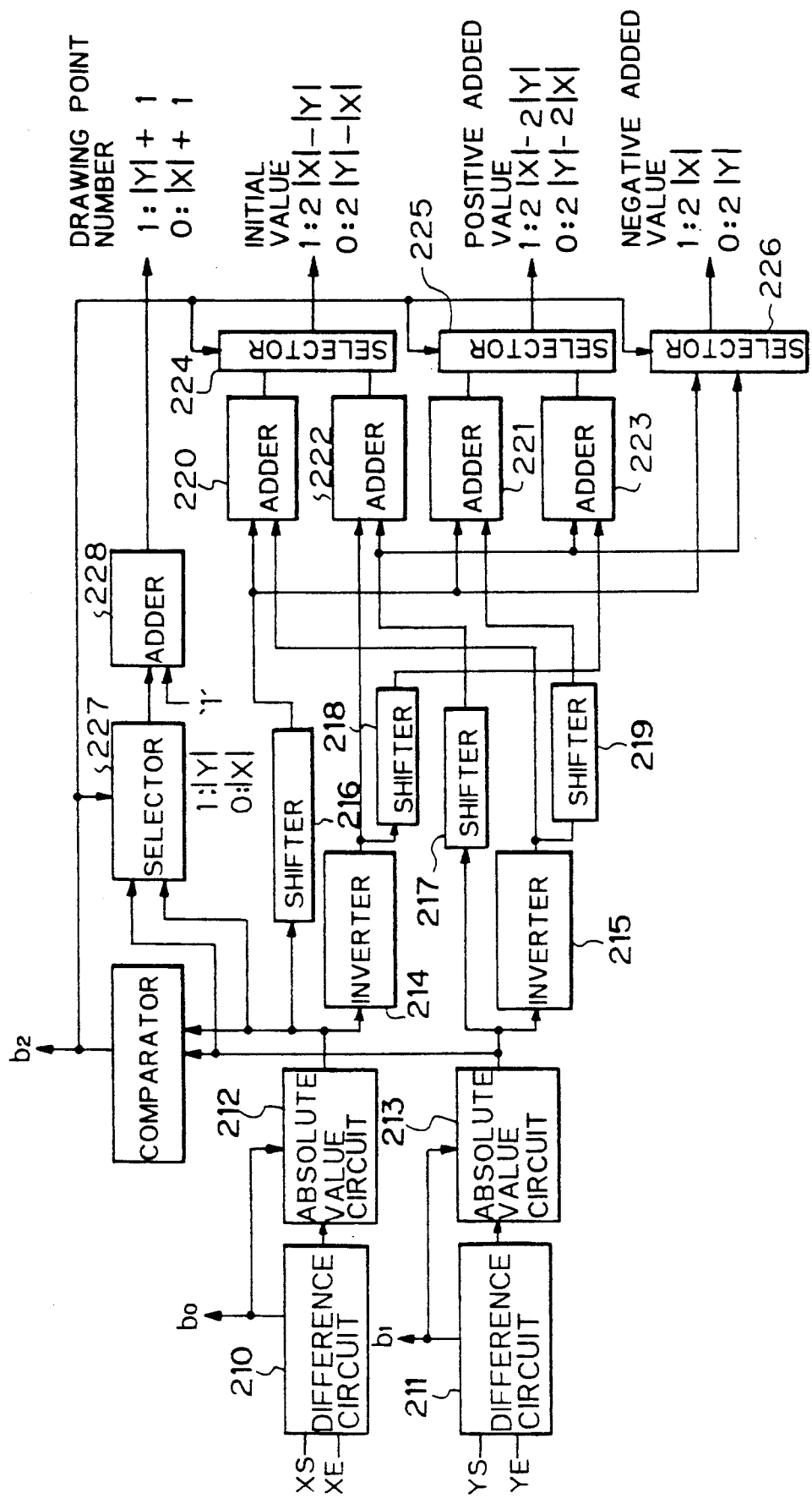
FIG. 4 is a detailed diagram of the circuit for setting up parameters shown in FIG. 2.

An operation of the straight line generator will now be described with reference to FIG. 4. Firstly, the X difference absolute value circuit 100 shown in FIG. 2 is explained. The reference numeral 210 designates a circuit for obtaining a difference between two inputs, that is, a difference between the X coordinate XS of the start point of a line and the X coordinate XE of the end point of the line; and 212 a circuit for obtaining the absolute value of an input signal, that is, to the circuit 212 (XE−XS) output from the circuit 210 is input and from the circuit 212 the absolute value $|X| = |XE-XS|$ is output. More specifically, the computation of $|X|=|XE-XS|$ in STEP 2 in FIG. 3 is executed here and the absolute value $|X|$ of the difference between the X coordinates of the opposite end points constituting a line may be acquired. The circuit 210 outputs a code b0 of one bit. This one bit code b0 is 0 if XE≧XS and 1 if XE<XS. An operation of the Y difference absolute value circuit 110 in FIG. 2 is similar to that of the X difference absolute value circuit 100. Computation of $|Y|=|YE-YS|$ in STEP 3 in FIG. 3 is executed by substituting YS for XS and YE for XE, whereby the absolute value $|Y|$ of the difference between the Y coordinates of the opposite end points constituting the line may be obtained. The code output from the Y difference absolute value circuit 110 is designated as b1.

Figures 5, 6:
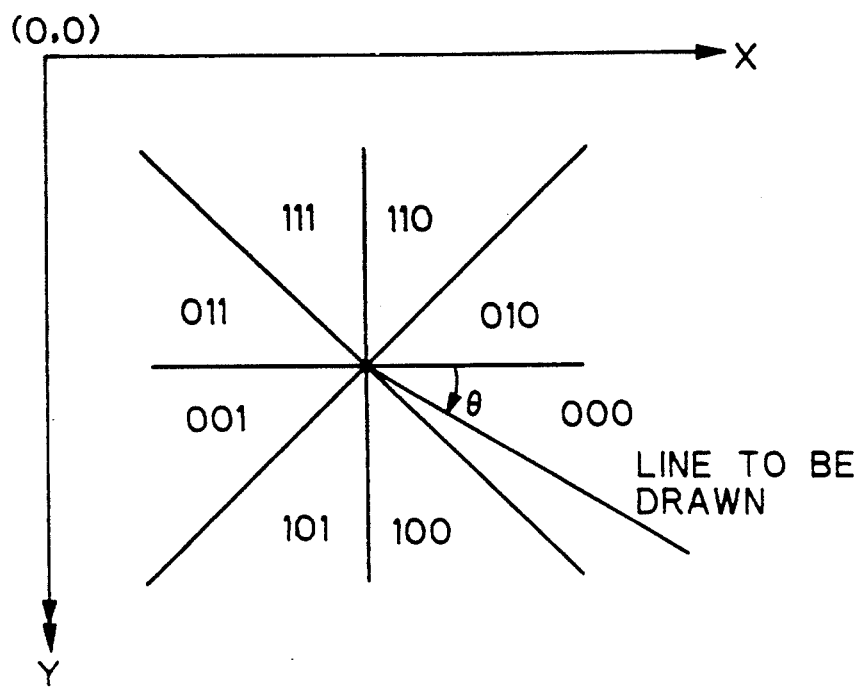
FIG. 5 illustrates a relationship between the slope of a line and a region code thereof.
FIG. 6 illustrates conditions of the region codes.

An operation of the region code calculating circuit 120 shown in FIG. 2 will next be explained. It is noted that a line to be drawn is classified to one of line patterns belonging to eight regions as shown in FIG. 5 by putting the starting point in the center. The conditions of the regions to which the respective line patterns belong are enumerated in FIG. 6. FIG. 5 shows codes of three bits given to the regions to which the respective line patterns belong and these codes of three bits are output from the region code calculating circuit 120. As it is seen from FIG. 6, two lower order bits in these three-bit codes correspond to the outputs b1 and b0 of the Y difference absolute value circuit 110 and the X difference absolute value circuit 100, respectively. The remaining one bit or b2 is obtained by comparing the outputs $|X|$ of the X difference absolute value circuit 100 and $|Y|$ of the Y difference absolute value circuit 110. If $|X| \geq |Y|$, then b2=0. Conversely, if $|X| < |Y|$, then b2=1.

In this manner, the calculation specified in STEP 4 in FIG. 3 is executed and three-bit region code is output from the region code calculating circuit 120.

Operations of the initial value calculating circuit 130, the positive added value calculating circuit 140 and the negative added value calculating circuit 150 will next be explained. These circuits are operable depending on the output of the region code calculating circuit 120 or b2. As seen from FIG. 5 if b2 is 0, then a line is drawn along the X axis, the initial value in the Bresenham algorithm is equal to $2|Y| - |X|$, the positive added value is equal to $2|Y| - 2|X|$, and the negative added value is equal to $2|Y|$. Conversely, if b2 is 1, a line is drawn along the Y axis, the initial value in the Bresenham algorithm is equal to $2|X| - |Y|$, the positive added value is equal to $2|X| - 2|Y|$, and the negative added value is equal to $2|X|$. In FIG. 4, the reference numerals 214 and 215 designate inverters adapted to obtain the inverse of the input values; 216 through 219 shifters to make input values double; 220 through 223 adders adapted to obtain the sums of two input values; and 224 through 226 selectors adapted to select upper input values if b2 is 1 and select lower input values if b2 is 0. The output $|X|$ of the X difference absolute value circuit 100 is converted to $-|X|$ by the inverter 214, or $2|X|$ by the shifter 216. The output of the inverter 214 or $-|X|$ is converted to $-2|X|$ by the shifter 218. Similarly, $2|Y|$, $-|Y|$ and $-2|Y|$ are obtained from the output $|Y|$ of the Y difference absolute value circuit 110. Inputting these obtained values to the adders 220 through 223 result in $2|X|-|Y|$, $2|X|-2|Y|$, $2|Y|-|X|$ and $2|Y|-2|X|$. $2|X|$ and $2|Y|$ also output from the shifters 216 and 217 are supplied to the selector 226 for selection, which enables computation in STEP 5 through STEP 7 to be executed to obtain the initial value, the positive added value and the negative added value.

An operation of the drawing point number calculating circuit 160 shown in FIG. 2 will next be explained. Similar to the initial value calculating circuit 130, the positive added value calculating circuit 140 and the negative added value calculating circuit 150, the circuit 160 is also operable depending on the output, b2, from the region code calculating circuit 120. More specifically, as explained above, if b2 is 0, a line is drawn along the X axis, so that the number of points to draw the line is equal to $|X|+1$. Conversely, if b2 is 1, since a line is drawn along the Y axis, the number of points to draw the line is equal to $|Y|+1$. In FIG. 4, the reference numeral 227 designates a selector; and 228 an adder. The selector 227 select $|X|$ if b2 is 0 and $|Y|$ if b2 is 1, and 1 is added by the adder 228 to the output of the selector 227, whereby the computation specified by STEP 8 in FIG. 3 is executed and the number of points to draw a line is computed.

In this manner, the initial value S, the positive added value P, the negative added value N and the number of points to draw a line T in the Bresenham algorithm have been obtained corresponding to the region codes as a preprocess for a straight line generator.

Figure 7:
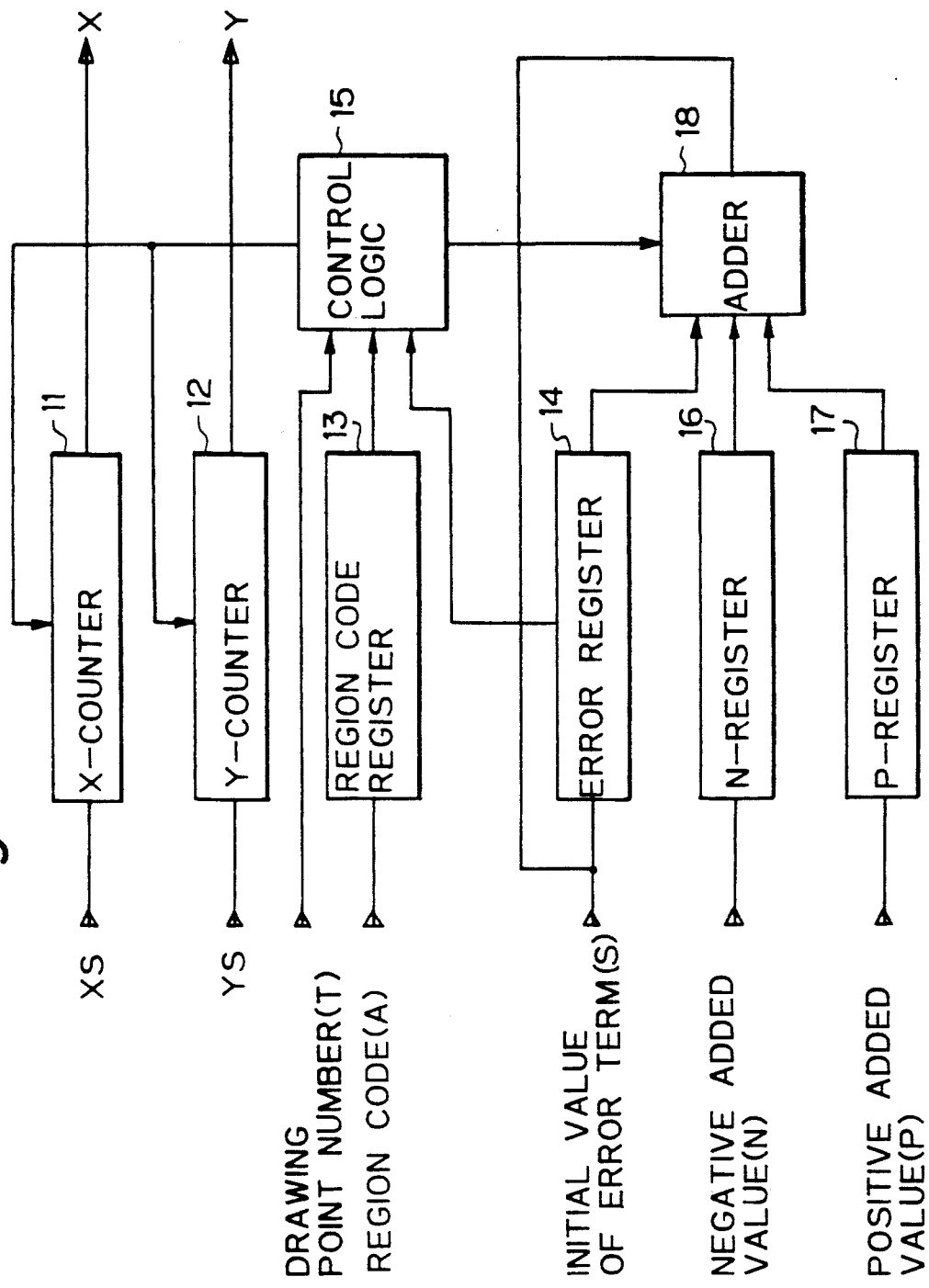
FIG. 7 is a block diagram showing the constitution of an embodiment of a line generator according to the present invention.

FIG. 7 is a block diagram illustrating the constitution of an embodiment of a straight line generator according to the present invention. In this figure, the reference numeral 11 designates an up/down X-counter which holds an X coordinate value; 12 designates an up/down Y-counter which holds a Y coordinate value; 13 a region code register which holds the region code depending on the slope of a linear line; 14 an error register which holds an error in the Bresenham algorithm; 15 a control logic adapted to control the increment and decrement of the X-counter 11 and the Y-counter 12 by referring to the data contained in the region code register 13 and the error register 14; 16 an N-register adapted to hold a parameter N (a negative added value) to be added when the data of the error register 14 is negative; 17 a P-register adapted to hold a parameter P (a positive added value) to be added when the data of the error register 14 is positive; and 18 an adder which selects either of the data of the N-register 16 and the P-register 17 depending on whether the data held in the error register 14 is positive or negative and adds the selected data to the data of the error register 14.

FIG. 8 shows a relationship among the slope of a line, an X coordinate value of the X-counter 11, a Y coordinate value of the Y-counter 12 and data contained in the region code register 13, the error register 14, the P-register 17 and the N-register 16, in the embodiment shown in FIG. 7. In a row A, outputs of the region code register 13 are shown and correspond to the regions divided by every 45 degrees. In this table, P designates a P-register value; N an N-register value; S an error register value; X and X-counter value; and Y a Y-counter value. Assuming that the coordinate of the start point of a linear line is (XS, YS) and that the coordinate of the end point is (XE, YE), $|X|$ is the absolute value of the difference between the X coordinate values of the start and end points, or $|XS-XE|$, and $|Y|$ is the absolute value $|YS-YE|$ of the difference between the Y coordinate values of the start and end points.

Figure 9:
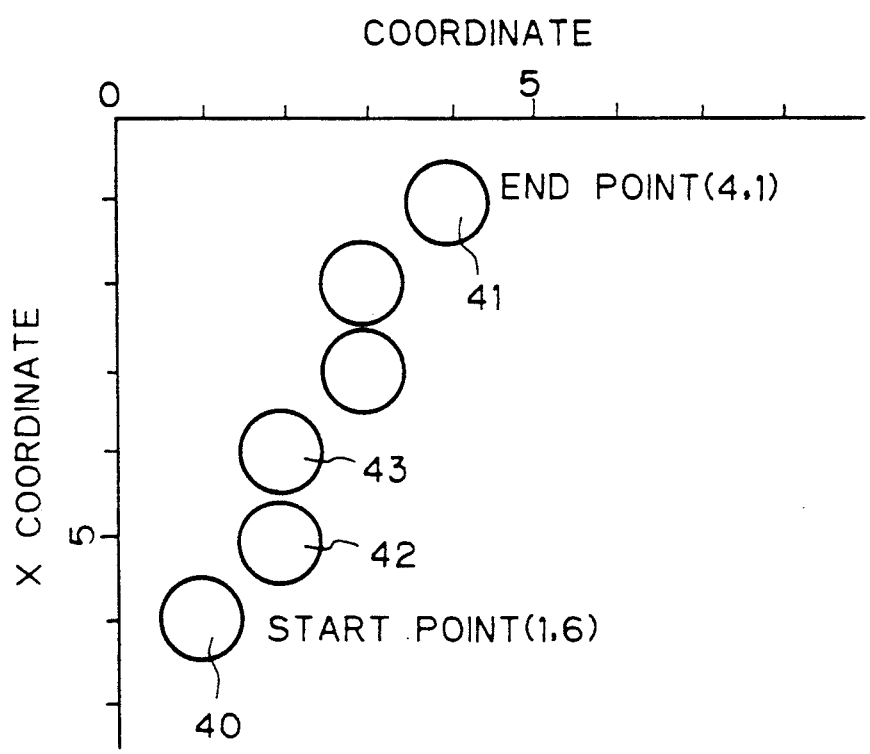
FIG. 9 illustrates an example of a line drawn by the line generator shown in FIG. 7.

FIG. 9 illustrates an example of pixel generation and an operation of the present embodiment shown in FIG. 7 will be explained by referring to FIGS. 5, 8 and 9. Assuming that a line has the start point at the coordinate (1, 6) and the end point at the coordinate (4, 1) as shown in FIG. 9, it is seen from FIG. 5 that the region code corresponding to this line is "110" based on the logic earlier described. The absolute value $|X|$ of the difference between the X coordinate value of the start point and the X coordinate value of the end point is 3, while the absolute value $|Y|$ of the difference between the Y coordinate value of the start point and the Y coordinate value of the end point is 5. According to a calculation equation based on the Bresenham algorithm corresponding to the region code "110" in FIG. 5, P can be obtained as $-4$, N as 6 and the initial value of S as 1. These parameters are generated and given to the straight line generator. Thus P is loaded in the P-register 17, N in the N-register 16, S in the error register 14 and A in the region code register 13.

A general operation of the straight line generator shown in FIG. 7 will now be explained. A signal representing a positive or negative sign is fed from the error register 14 to the control logic 15. The control logic 15, in reference to the data of the region code register 13, transmits commands for operation to the X-counter 11 and the Y-counter 12. The adder 18, in reference to the data of the error register 14, selects one of the registers and adds the content of the selected register to the content of the error register 14.

Referring to FIG. 8, a concrete example of drawing a line described above will next be explained. Since a value of S at the start point of the line is 1 and therefore the sign is positive, the straight line generator operates, as shown in FIG. 8, to increase the X coordinate value X by 1, decrease the Y coordinate value Y by 1 and add the increment P to S.

The case as above described will next be explained with reference to FIG. 7. When a signal indicating that the sign is positive is sent from the error register 14 to the control logic 15, the signal causes the control logic 15 to recognize that the region code is 110 by referring to the data of the region code register 13, and to instruct the X-counter 11 to be incremented by 1 and the Y-counter 12 to be decremented by 1, as shown in FIG. 7. The adder 18 selects the P-register 17 as the register the data of which is to be added to the data of the error register 14 by referring to the sign of the data of the error register 14, and adds the data "1" of the error register 14 and the data "$-4$" of the P-register 17 so as to set "$-3$" in the error register 14. The X counter 11 is then incremented by 1 and outputs the X coordinate value "2", while the Y-counter 12 is decremented by 1 and outputs the Y coordinate value "5". In this way, the coordinate (2, 5) of the pixel 42 next to the starting point is generated.

Next, how a second pixel is generated will be explained by referring to FIG. 8. Since S is "$-3$" at the coordinate (2, 5) of the pixel 42, the sign is negative and the straight line generator operates such that there is no change in the X coordinate value X, that the Y coordinate value Y is decremented by 1 and that the increment N is added to S, as shown in FIG. 8.

This case will next be explained by referring to FIG. 7. When a signal indicating that the sign is negative is fed from the error register 14 to the control logic 15, the control logic 15 refers to the data of the region code register 13. Since the region code is "110", the control logic 15 instructs the X-counter 11 not to be changed and the Y-counter 12 to be decremented by 1. In reference to the sign of the data "$-3$" of the error register 14, the adder 18 selects the data "6" of the N-register 16 as data to be added to the error register 14 and adds the data "$-3$" and "6", thereby setting the resultant value "3" in the error register 14. The X-counter 11 still outputs the same value "2" and the Y-counter 12 decrements the Y coordinate value by 1 and outputs 4. In this manner, the coordinate (2, 4) of the pixel 43 is generated.

By repeating the above-described operation from the coordinate of the start point to the coordinate of the end point, the coordinates of pixels are generated for interpolation between the start point and the end point. The number of such repetition depends on a value of the number of points T to draw a line to be input to the control logic 15. Since $T = |Y| + 1 = 6$ in this example, the above-mentioned operation is repeated five times except for the starting point. FIG. 9 illustrates the pixel generated by repeating the above-described operation.

The region code (b2 b1 b0) which characterizes the present invention will be further explained here. As shown in FIG. 5, the region code b0 divides the region into two parts, or the left region and the right region. The region code b1 divides the region into two parts, or the upper region and the lower region. Accordingly, when these regions codes b1, b0 are combined together, it is possible to identify four regions, or the upper-left, upper-right, lower-left and lower-right regions. Furthermore, the region code b3 divides the region into two parts in accordance with which of the X axis or the Y axis becomes the main axis by putting the borderlines on lines having the inclination angles of 45° or 135°. Accordingly, all the angles (360°) may be covered by eight region codes provided by b2 b1 b0. The control logic 15 controls operations of the X-counter and the Y-counter, respectively, for eight region codes in correspondence to the region codes which thus cover the entire region, so as to generate pixels. By employing such region codes as described above, exchange between the start point and the end point as well as between an X coordinate value and a Y coordinate value may become entirely unnecessary.

According to the present invention, since pixels are generated by using the Bresenham algorithm, a dividing circuit may be omitted and all arithmetical operations may be conducted using integers, whereby high-speed line drawing may be possible. Furthermore the operations of the X-counter 11, the Y-counter 12 and the error register 14 may be automatically indicated according to the region codes covering 360 degrees and the sign of the error register 14, whereby straight line may be generated in any direction.

What is claimed:

1. A straight-line generator for drawing a straight line having a slope, a start point and an end point, each point having coordinates in a discrete coordinate system by use of a Bresenham algorithm, comprising:
   a first counter for holding an X coordinate value and capable of incrementing and decrementing the X coordinate value;
   a second counter for holding a Y coordinate value and capable of incrementing and decrementing the Y coordinate value;
   a region code register for holding a region code, said region code representing the slope of the straight line and a relation of the coordinates of the end point to the coordinates of the start point;
   an error register for holding an error term obtained from the Bresenham algorithm;
   control logic responsive to said region code register and said error register for controlling incrementing and decrementing of said first and second counters whereby coordinate positions along the straight line are generated;
   an N-register and a P-register, each for holding an error update parameter; and
   an adder responsive to the control logic for selecting an error update parameter from one of the N-register and the P-register in accordance with a sign of the error term held in said error register and for adding the selected error update parameter to said error term in said error register.

2. An apparatus for drawing a straight line having a start point and an end point in a discrete coordinate system comprising:
   (a) means for receiving X coordinate values and Y coordinate values of the start point and the end point of the line;
   (b) means for computing an X difference value and an X difference absolute value and a Y difference value and a Y difference absolute value of the start point and the end point of the line;
   (c) means for computing a region code defining a region obtained by dividing a range of 360 degrees in accordance with the X difference value, the Y difference value and a ratio of the X and Y difference absolute values;
   (d) means for computing an initial error term value based on a ratio of the X difference absolute value and the Y difference absolute value;
   (e) means for computing a positive added value which is added to the error term value when the error term value is positive;
   (f) means for computing a negative added value which is added to the error term value when the error term value is negative;
   (g) means for storing and repetitively performing incrementing and decrementing operations of X and Y coordinates specified by a combination of the region code and a sign of the error term value; and
   (h) means for repetitively and selectively adding either of the positive added value and the negative added value to the error term value on the basis of the sign of the error term value.

3. A method of drawing a straight line having a start point and an end point in a discrete coordinate system, comprising the steps of:
   (a) reading X coordinate values and Y cocrdinate values of the start point and the end point of the line;
   (b) computing an X difference value and an X difference absolute value and a Y difference value and a Y difference absolute value of the start point and the end point of the line;
   (c) computing a region code defining a region obtained by dividing a range of 360 degrees in accordance with the X difference value, the Y difference value and a ratio of the X and Y difference absolute values;
   (d) computing an initial error term value based on the ratio of the X difference absolute value and the Y difference absolute value;
   (e) computing a positive added value which is added to the error term value when the error term value is positive;
   (f) computing a negative added value which is added to the error term value when the error term value is negative;
   (g) selecting X and Y coordinates and repetitively incrementing and decrementing these coordinates according to the combination of the region code and the error term value;
   (h) repetitively and selectively adding either of the positive added value and the negative added value to the error term value on the basis of a sign of the error term value.

4. A straight line generator for drawing a straight line in a discrete coordinate system comprised of pixels, each pixel having a first coordinate and a second coordinate, said straight line having a slope, a start pixel and an end pixel, said generator determining the coordinates for intermediate pixels between the start and end pixels and comprising:
   means for storing the first and second coordinates of at least a current intermediate pixel;
   a region code register for storing a region code indicative of a relation of the coordinates of the end pixel to the coordinates of the start pixel and of the slope of said straight line;
   an error register for storing an error term obtained using a Bresenham algorithm;
   a first register for storing a first error update value;
   a second register for storing a second error update value;
   an adder for selecting an error update value from the first and second registers and for adding the selected error update value to the error term in the error register;

control logic for successively updating the current first and second coordinates in the means for storing on the basis of said region code and said error term and for controlling the selection of error update values by said adder.

5. A straight line generator as set forth in claim 4, further comprising a region code calculator which comprises:
- a first difference absolute value circuit for providing a signal indicative of the absolute value of the difference between the first coordinate of the start pixel and the first coordinate of the end pixel;
- a second difference absolute value circuit for providing a signal indicative of the absolute value of the difference between the second coordinate of the start pixel and the second coordinate of the end pixel;
- a region code calculation circuit responsive to said first and second difference absolute value circuits for providing a signal indicative of the region code.

6. A straight line generator as set forth in claim 5, wherein:
- said first difference absolute value circuit provides a first region signal indicative of the relative position in the coordinate system of the first coordinates of the start and end pixels;
- said second difference absolute value circuit provides a second region signal indicative of the relative position in the coordinate system of the second coordinates of the start and end pixels; and
- said region code calculation circuit provides a third region signal indicative of the relative magnitudes of said first difference and said second difference,
- said region code comprised of said first, second and third region signals.

7. A straight line generator as set forth in claim 4, wherein said region code comprises:
- a first region signal indicative of the relative position in the coordinate system of the first coordinates of the start and end pixels;
- a second region signal indicative of the relative position in the coordinate system of the second coordinates of the start and end pixels; and
- a third region signal indicative of the relative magnitudes of the difference of the first coordinates of said start and end pixels and the difference of the second coordinates of said start and end pixels.

8. A straight line generator as set forth in claim 4 further comprising:
- means for calculating the error term, the first error update value, and the second error update value.

9. A straight line generator as set forth in claim 8, wherein said means for calculating comprises:
- first means for receiving the signal from the first difference absolute value circuit;
- second means for receiving the signal from the second difference absolute value circuit;
- third means for receiving the region code;
- means for providing a signal indicative of the error term, said error term selected from one of the difference between double the first absolute value and the second absolute value and the difference between double the second absolute value and the first absolute value, the selection based upon said region code;
- means for providing a signal indicative of the first error update value, said value selected from the difference between double the first absolute value and double the second absolute value and the difference between double the second absolute value and double the first absolute value, the selection based upon said region code;
- means for providing a signal indicative of the second error update value, said signal selected from double the first absolute value and double the second absolute value, the selection based upon said region code.

10. A straight line generator for drawing a straight line in a discrete coordinate system comprised of pixels, each pixel having a first coordinate and a second coordinate, said straight line having a start pixel and an end pixel, said generator determining the coordinates for intermediate pixels between the start and end pixels and comprising:
- means for storing the first and second coordinates of at least a current intermediate pixel;
- a region code register for storing a region code indicative of a region of a circle in which at least a portion of the straight line is located, said circle having a center defined by a pixel of said straight line;
- an error register for storing an error term obtained using a Bresenham algorithm;
- a first register for storing a first error update value;
- a second register for storing a second error update value;
- an adder for selecting an error update value from the first and second registers and for adding the selected error update value to the error term in the error register;
- control logic for successively updating the current first and second coordinates in the means for storing on the basis of said region code and said error term and for controlling the selection of error update values by said adder.

11. A straight line generator as set forth in claim 10 wherein said circle has a center defined by said end pixel.

12. A straight line generator as set forth in claim 10, wherein said circle has a center defined by said start pixel.

13. A method of drawing a straight line having a slope, a start point and an end point, each point having coordinates in a discrete coordinate system by use of a Bresenham algorithm, comprising:
- computing a region code indicative of the slope of the straight line, and a relation of the coordinates of the end point to the coordinates of the start point;
- computing an error term using the Bresenham algorithm;
- providing an error adjustment term;
- repetitively incrementing and decrementing the coordinates of one of the start point and the end point to generate coordinates of points intermediate the start point and the end point, the incrementing and decrementing being performed on the basis of the error term, the region code and the error update value; and displaying a line in accordance with the coordinates generated.

14. An apparatus for drawing a straight line having a start point and an end point in a discrete coordinate system comprising:

(a) means for receiving X coordinate values and Y coordinate values of the start point and the end point of the line;

(b) means for computing an X difference value and an X difference absolute value and a Y difference value and a Y difference absolute value of the start point and the end point of the line;

(c) means for computing a region code defining a region obtained by dividing a range of 360 degrees in accordance with the X difference value, the Y difference value and a ratio of the X and Y difference absolute values;

(d) means for computing an initial error term value based on the ratio of the X difference absolute value and the Y difference absolute value;

(e) means for computing a positive added value which is added to the error term value when the error term value is positive;

(f) means for computing a negative added value which is added to the error term value when the error term value is negative;

(g) means for storing and repetitively performing incrementing and decrementing operations of X and Y coordinates specified by a combination of the region code and a sign of the error term value to generate coordinates of points for the line;

(h) means for repetitively and selectively adding either of the positive added value and the negative added value to the error term value on the basis of the sign of the error term value; and (i) means for displaying the line in accordance with the coordinates generated by the means for performing incrementing and decrementing operations.

15. A method of drawing a straight line having a start point and an end point in a discrete coordinate system, comprising the steps of:

(a) reading X coordinate values and Y coordinate values of the start point and the end point of the line;

(b) computing an X difference value and an X difference absolute value and a Y difference value and a Y difference absolute value of the start point and the end point of the line;

(c) computing a region code defining a region obtained by dividing a range of 360 degrees in accordance with the X difference value, the Y difference value and a ratio of the X and Y difference absolute values;

(d) computing an initial error term value based on the ratio of the X difference absolute value and the Y difference absolute value;

(e) computing a positive added value which is added to the error term value when the error term value is positive;

(f) computing a negative added value which is added to the error term value when the error term value is negative;

(g) selecting X and Y coordinates and repetitively incrementing and decrementing these coordinates according to a combination of the region code and the error term value to generate coordinates of points on the line;

(h) repetitively and selectively adding either of the positive added value and the negative added value to the error term value on the basis of a sign of the error term value; and (i) displaying the line in accordance with the generated coordinates.

* * * * *